United States Patent [19]
Pierick et al.

[11] Patent Number: 5,929,147
[45] Date of Patent: Jul. 27, 1999

[54] EMBRITTLEMENT-RESISTANT POLYOLEFIN COMPOSITION AND FLEXIBLE ARTICLES THEREFROM

[75] Inventors: David E. Pierick, Elk Township, Pa.; Thomas J. O'Neal, Wilmington, Del.

[73] Assignee: Montell North America Inc., Wilmington, Del.

[21] Appl. No.: 08/665,785

[22] Filed: Jun. 18, 1996

[51] Int. Cl.$^6$ .................................................. C08L 23/10
[52] U.S. Cl. ......................... 524/99; 524/102; 524/262; 524/265; 524/174; 524/318; 524/334; 524/341; 524/345; 524/349; 524/351; 524/352; 524/394; 524/436; 524/437; 524/444; 524/579; 525/240; 428/36.9; 604/38; 604/187; 604/218; 606/151; 606/205
[58] Field of Search ............................ 525/240; 524/579, 524/582, 583, 584, 174, 318, 334, 341, 345, 349, 350, 351, 352, 353, 394, 436, 437, 444, 99, 102, 262, 265; 428/36.9; 606/151, 205; 604/38, 187, 218

[56] References Cited

U.S. PATENT DOCUMENTS

| | | | |
|---|---|---|---|
| 4,110,185 | 8/1978 | Williams et al. | 204/159.2 |
| 4,274,932 | 6/1981 | Williams et al. | 204/159.2 |
| 4,467,061 | 8/1984 | Yamamoto et al. | 524/87 |
| 4,563,259 | 1/1986 | Rayner | 524/99 |
| 4,710,524 | 12/1987 | Donohue | 522/75 |
| 4,749,734 | 6/1988 | Williams et al. | 524/102 |
| 4,785,034 | 11/1988 | Gaku et al. | 524/99 |
| 4,797,438 | 1/1989 | Kletecka et al. | 524/100 |
| 4,888,369 | 12/1989 | Moore, Jr. | 524/100 |
| 4,972,009 | 11/1990 | Suhadolnik et al. | 524/99 |
| 4,985,479 | 1/1991 | Nagasaki et al. | 524/96 |
| 5,001,205 | 3/1991 | Hoel | 526/128 |
| 5,200,443 | 4/1993 | Hudson | 524/99 |
| 5,324,880 | 6/1994 | Dyroff | 585/660 |
| 5,362,782 | 11/1994 | McCullough, Jr. et al. | 524/108 |
| 5,371,124 | 12/1994 | Cooke | 524/99 |
| 5,491,207 | 2/1996 | Hoel | 526/129 |

FOREIGN PATENT DOCUMENTS

| | | |
|---|---|---|
| 0 228 837 A2 | 7/1987 | European Pat. Off. . |
| 343717 | 11/1989 | European Pat. Off. . |
| 0 551 062 A2 | 7/1993 | European Pat. Off. . |
| 664315 | 7/1995 | European Pat. Off. . |
| 42 16 923 | 11/1993 | Germany . |
| WO 95/14739 | 6/1995 | WIPO . |
| WO 97/08238 | 3/1997 | WIPO . |

OTHER PUBLICATIONS

Patent Abstracts of Japan, JP 04 142354 A, vol. 016, No. 419 (May 15, 1992).
English Translation of Japanese Patent Application No. Hei–4–142354 (1992).
"Testing Methods for Optical Properties of Plastics" JIS K 7105 pp. 294–325.
Uvasil 299 brochure (undated).

*Primary Examiner*—Mark L. Warzel

[57] ABSTRACT

An embrittlement-resistant polyolefin composition, including: (a) at least 80% by weight, based on the total weight of the polyolefin composition, of a crystalline polymer comprising either a propylene homopolymer having an isotactic index greater than 90 or a random copolymer of propylene and either ethylene or $C_4$–$C_{10}$ 1-olefins, (b) an elastomeric copolymer of ethylene and either propylene or butene-1, where the elastomeric copolymer is present in an amount sufficient to enhance the flexibility of the polyolefin composition, without adversely affecting the clarity of the polyolefin composition, and where the polyolefin composition has a heat distortion temperature of at least 60° C. Optional components include a stabilizing amount of a hindered amine light stabilizer, an acid neutralizing agent, and a sorbitol-based compound. The composition may be used to manufacture medical articles and food packaging material which must be sterilized, either by irradiation or by autoclaving.

19 Claims, 4 Drawing Sheets

EMBRITTLEMENT-RESISTANT POLYOLEFIN COMPOSITION AND FLEXIBLE ARTICLES THEREFROM

FIELD OF THE INVENTION

The present invention relates to a substantially transparent, embrittlement-resistant polyolefin composition and to flexible, sterilizable articles produced therefrom.

BACKGROUND OF THE INVENTION

Various articles made of polyolefins must be sterilized, either by radiation or by autoclaving. For example, it is known to sterilize articles such as syringe barrels and plungers, tubing, surgical clamps, packaging film, tissue culture tubes, fibers for surgical gowns and sheets with high energy radiation. A radiation dosage of 2.5 to 5.0 megarads is usually sufficient to effectively sterilize such shaped articles and the material contained therein. However, polymeric articles exposed to such radiation typically suffer from discoloration and embrittlement, which can render them unfit for their intended use.

The prior art has sought to inhibit such radiation-induced discoloration and/or embrittlement by incorporating various additives to the polymeric composition prior to molding or shaping of the polymer into a useful article. Thus, for example, U.S. Pat. No. 4,110,185 describes incorporating a low molecular weight, preferably not highly viscous, liquid mobilizer, such as a hydrocarbon oil, into a semi-crystalline polypropylene to increase the free volume of the polymer and allow it to retain its flexibility after irradiation. U.S. Pat. No. 4,274,932 describes incorporating the mobilizer in a semi-crystalline polypropylene which has been visbroken to narrow its molecular weight distribution. See also U.S. Pat. No. 4,474,734. However, peroxide visbreaking produces tert-butylalcohol in the polymer, which causes an objectionable odor.

U.S. Pat. No. 5,371,124 to Cooke provides a good summary of the various additives which have been proposed to enhance the radiation resistance of propylene polymer compositions. See also U.S. Pat. No. 4,888,369 to Moore, Jr. However, any additive must be compatible with the other components of the polymer composition, and may cause other problems, including objectionable odor and/or color, processing difficulties, bleeding of the additive from the article over time, etc. See, for example, U.S. Pat. No. 4,710,524, which suggests that the inclusion of a mobilizing additive as described in U.S. Pat. Nos. 4,110,185 and 4,274,932 produces undesirable handling and imprinting problems. Finally, the addition of an oil mobilizer adds significant cost to the polymer product.

Syringe grade material made from polypropylene typically must be peroxide visbroken from a low melt flow rate (MFR) to obtain a narrow molecular weight distribution and must contain oil as a mobilizer to improve the free radical scavenging ability of a hindered amine light stabilizer additive. The polypropylene material typically also contains a sorbitol-based additive as a clarifier.

It is also known to incorporate an elastomeric component into polymeric compositions in order to enhance the mechanical properties of articles made therefrom. For example, U.S. Pat. No. 4,985,479 discloses a stabilized polyolefin composition which is said to possess good weathering resistance and mechanical properties. The polyolefin can include a synthetic rubber copolymer of ethylene and alpha-olefin, such as ethylene propylene copolymer, ethylene butene-1 copolymer, ethylene hexene-1 copolymer, and terpolymers of ethylene, propylene and non-conjugated diene (EPDM). Other examples of stabilized polyolefin compositions having elastomeric components are disclosed in U.S. Pat. Nos. 4,972,009; 4,785,034; and 4,467,061.

However, the addition of such elastomers typically reduces the clarity of the article, which is often undesirable. This problem is particularly acute for products which are manufactured by injection molding processes in comparison to films. Injection molded articles are often up to ten times or more thicker (0.06 inch) than films (0.006 inch thick), and thus any haze will be much more noticeable in the injection molded article than the film. Films are typically produced by biaxial orientation, which tends to improve clarity and radiation resistance. In contrast, injection molding typically causes an undesirable increase in embrittlement.

Yet another requirement for articles which may be sterilized by autoclaving rather than by radiation is a high heat distortion temperature. Such articles preferably have a heat distortion temperature of at least 70° C., and must have a heat distortion temperature of at least 60° C.

Japanese Patent Publication No. 4-142354 (1992) discloses a radiation resistant, visbroken polyolefin packaging film material prepared from a polyolefin resin composition composed of a crystalline propylene-ethylene random copolymer, a linear low density polyethylene, and an ethylene-butene copolymer rubber together with a specific additive comprising specified amounts of a hindered amine compound, an organic phosphorus compound and a sorbitol compound. Haze (cloudiness) is measured according to JIS K 7105, which is a test of film transparency. (Typically, films are from 3 to 5 mils thick, but can be as much as 8 mils thick.) Comparison of Example 2 with Comparative Example 2 shows that the addition of the linear low density polyethylene is essential to improved radiation resistance. However, linear low density polyethylene substantially reduces or eliminates the clarity of injection molded articles at the typical thickness of 40 to 90 mil for such articles. For example, at 40–90 mil thickness, an article would have a haze of about 60–80%, making clarity essentially non-existent. Typically, syringe parts are 45 to 70 mils thick.

An object of the present invention is to provide an embrittlement-resistant polymer composition which does not require a costly visbreaking step or the incorporation of a mobilizing oil additive to impart radiation resistance.

Another object of the present invention is to provide an embrittlement-resistant polymer composition which contains an elastomeric component yet which is substantially transparent.

Another object of the present invention is to provide an embrittlement-resistant polymer composition which can be injection molded into flexible, substantially transparent articles.

Yet another object of the present invention is to provide a radiation- and heat-resistant polymer composition which exhibits a heat distortion temperature of at least 60° C., and preferably greater than 70° C.

BRIEF SUMMARY OF THE INVENTION

In one aspect, the present invention relates to an embrittlement-resistant polyolefin composition, comprising:

(a) at least 80% by weight, based on the total weight of the polymer composition, of a crystalline polymer comprising either a propylene homopolymer having an isotactic index greater than 90 or a random copolymer of propylene and either ethylene or $C_4$–$C_{10}$ 1-olefins, (b) an elastomeric copolymer comprising ethylene and either propylene or butene-1, wherein the elastomeric copolymer is present in an amount sufficient to enhance the flexibility of the polyolefin composition, without adversely affecting the clarity of the polyolefin composition, and where the polyolefin composition has a heat distortion temperature of at least 60° C.

The present invention also provides a sterilizable article in which at least part of the material construction thereof comprises the embrittlement-resistant polyolefin composition of this invention.

In another embodiment, this invention provides a sterilized article made by converting the polyolefin composition of this invention into an useful article and then subjecting the article to high energy radiation or autoclaving to sterilize the article.

DETAILED DESCRIPTION OF THE PREFERRED EMBODIMENTS

The Applicant has unexpectedly discovered that an embrittlement-resistant, transparent polyolefin composition which does not require a costly visbreaking step or the incorporation of an additional additive to impart radiation resistance can be provided if the crystalline propylene polymer and the elastomeric copolymer have substantially the same melt flow rates (MFR), or the monomers used to produce the elastomeric copolymer are polymerized in such a manner so as to provide a chi value of at least 0.90, preferably at least 0.95, or both. Moreover, injection molded articles prepared from the Applicant's composition exhibit surprising resistance to long term embrittlement in comparison to the prior art and sate of the art compositions containing a mobilizer.

As used herein, "substantially the same MFR" means that the Δ MFR is greater than or equal to zero to 10, preferably 0 to 2.0, and most preferably 0 to 0.7, where Δ MFR is equal to the crystalline polymer's MFR minus the elastomeric copolymer's MFR. "Chi value" can range from 0 to 2, and is a measure of the randomness of the distribution of two monomers in a copolymer based on $^{13}$C NMR spectral data. Ethylene propylene polymers polymerized using conventional Ziegler-Natta catalysts generally have a chi value of 0.85 to 0.89.

The crystalline propylene polymer may be a propylene homopolymer having an isotactic index of at least 90 or, more preferably, may be a crystalline, random copolymer of propylene and an olefin selected from the group consisting of ethylene, and $C_4$–$C_{10}$ 1-olefins, provided that, when the olefin is ethylene, the maximum polymerized ethylene content is about 10, preferably about 4, percent by weight, and, when the olefin is a $C_4$–$C_{10}$ 1-olefin, the maximum polymerized content thereof is about 20, preferably about 16, percent by weight. The crystalline random copolymer typically has a propylene content of at least 95% by weight where ethylene is the comonomer, and of at least 90% by weight when a $C_4$–$C_{10}$ 1-olefin is the comonomer.

The $C_4$–$C_{10}$ 1-olefins include the linear and branched $C_4$–$C_{10}$ 1-olefins such as, for example, 1-butene, 1-pentene, 3-methyl-1-butene, 4-methyl-1-pentene, 1-hexene, 3,4-dimethyl-1-butene, 1-heptene, 3-methyl-1-hexene, and the like. 1-Butene is preferred.

The elastomeric copolymer has an ethylene content of 55 to 80%, preferably 65 to 75%.

The crystalline propylene polymer, elastomeric copolymer and various additives discussed below may be melt blended together by using conventional extrusion or mixing equipment such as a single screw extruder, twin-screw extruder, Banbury mixer, Brabender mixer, etc. Preferably, an as-polymerized (i.e. as produced by the polymerization reaction without further processing or treatment) composition of the crystalline polymer and the elastomeric copolymer is melt blended with the additive(s).

The as-polymerized polyolefin composition or the individual polymer components thereof can be prepared using a metallocene or Ziegler-Natta catalyst such as titanium- or vanadium-based Ziegler-Natta catalysts. As-polymerized compositions are preferred. More particularly, the crystalline propylene polymer may be prepared by metallocene catalyst as described in U.S. Pat. No. 5,324,800, the disclosure of which is expressly incorporated herein. The elastomeric copolymer may be prepared by metallocene catalyst as described in U.S. Pat. Nos. 5,001,205 and 5,491,207, the disclosures of which are expressly incorporated herein.

The embrittlement-resistant composition of this invention may include at least one hindered amine light stabilizer, e.g., one or more of the hindered heterocyclic amine light stabilizers known to the art and commonly referred to as HALS. Such additives are described, for example, in the previously-mentioned U.S. Pat. Nos. 4,710,524, 4,749,734, 4,797,438, and 4,888,369, the disclosures of which with respect to the HALS materials are incorporated herein by reference.

Exemplary hindered amine light stabilizers include polymethylpropyl-3-oxy-[4-(2,2,6,6-tetramethyl) piperidinyl] siloxane; bis(2,2,6,6-tetramethyl-4-piperidyl) sebacate; bis-(1,2,2,6,6-pentamethyl-4-piperidyl) sebacate; bis-(1,2,2,6,6-pentamethyl-4-piperidyl)-2-n-butyl-2-(3,5-di-tert-butyl-4-hydroxybenzyl)malonate; 4-benzoyloxy-2,2,6, 6,-tetramethyl piperidine; 1,2,3,4-tetra(2,2,6,6-tetramethyl-4-piperidyl) butanetetra-carboxylate; 1,4-di-(2,2,6,6-tetramethyl-4-piperidyl)-2,3-butanedione; tris-(2,2,6,6-tetramethyl-4-piperidyl) trimellitate; 1,2,2,6,6-pentamethyl-4-piperidyl stearate; 1,2,2,6,6-pentamethyl-4-piperidyl n-octoate; tris-(2,2,6,6-tetramethyl-4-piperidyl) nitrile sebacate; 4-hydroxy-2,2,6,6-tetramethylpiperidine; 4-hydroxy-1, 2,2,6,6-pentamethylpiperidine; and 1,1'-(1,2-ethanediyl)bis 3,3,6,6-tetramethylpiperadinone. Mixtures of such amines may be used.

Polymethyl-propyl-3-oxy-[4-(2,2,6,6-tetramethyl) piperidinyl] siloxane is especially preferred, and is commercially available from the Great Lakes Chemical Corporation under the trademark Uvasil 299.

The HALS compound is typically present in an amount of about 0.01 to 3.0 pph, preferably 0.05 to 2.0 pph and most preferably 0.10 to 0.2 pph. More than 3.0 pph of a HALS compound is generally not needed, although greater than 3.0 pph of HALS is within the broadest aspects of the invention.

The embrittlement-resistant composition of this invention may include at least one acid neutralizing agent, which may be selected from the group consisting of metal soaps, hydrotalcites, aluminum silicate, sodium stearate and oxides and hydroxides of Group II metals. Sodium stearate is a preferred acid neutralizing agent which is well known and commercially available.

The acid neutralizing agent is typically present in an amount of 0.01 to 1, preferably 0.05 to 0.1 weight percent, based on the total weight of the composition.

The embrittlement-resistant composition of this invention may include at least one sorbitol-based compound as a clarifier, which may be selected from the group consisting of bis-(3,5-dimethylbenzylidene) sorbitol; (1,3)2,4-di(p-methyl benzylidene) sorbitol; (1,3)2,4-di(p-chlorobenzylidene) sorbitol; and (1,3)2,4-di(p-methoxybenzylidene) sorbitol. Bis-(3,5-dimethylbenzylidene) sorbitol is a preferred sorbitol-based compound.

The sorbitol-based compound is typically present in an amount of 0.01 to 4, preferably 0.1 to 0.25 weight percent, based on the total weight of the composition.

Small amounts of other additives such as antioxidants and/or light stabilizers may be present in the propylene polymer composition. These include phenolic antioxidants of the kind used in polyolefins, e.g., tetrakis[methylene 3-3',5'-di-tert-butyl-4'-hydroxyphenyl) propionate] methane, which may be present in an amount less than 150 ppm. Heat- and light-stabilizing phosphites, e.g., tris-(2,4-di-tert-butylphenyl) phosphite, may be present in an amount of from 0.1 to 1 weight percent. Other additives such as fillers and colorants also can be present.

Typically, the composition has a MFR from 5 to 30, preferably 6 to 25.

The embrittlement-resistant composition of the present invention exhibits a haze of not greater than 20%, measured according to ASTM D 1003-92. Typically, the composition exhibits a haze of from 11 to 17%, when injection molded into plates having a thickness of 0.040 inch.

The embrittlement-resistant composition of the present invention preferably does not contain conventional mobilizing oils such as those disclosed in U.S. Pat. No. 4,749,734 to Williams et al. However, the use of such oils is within the broadest ambit of this invention.

The embrittlement-resistant composition of this invention may be manufactured into various articles possessing good flexibility. Typical useful articles include syringe barrels and plungers, tubing and tube assemblies, forceps, surgical clamps, packaging film, tissue culture tubes, fibers for surgical gowns, sheets and the like. Conventional manufacturing methods, such as molding, including injection molding, compression molding, extrusion molding, or vacuum molding; extrusion; extrusion casting; spun-bonding; melt blowing; etc, may be used to produce the articles.

The embrittlement-resistant articles may be sterilized using conventional techniques and apparatus well known to those of ordinary skill. A radiation dosage of 2.5 to 5.0 megarads is sufficient to effectively sterilize shaped articles and the material contained therein and is the industry standard. However, radiation dosages up to about 5.0 megarads can be applied even though dosages in excess of 2.5 megarads are not necessary to accomplish the sterilization. Alternatively, conventional autoclaving techniques and apparatus can be employed to sterilize the articles.

EXAMPLES

The following Examples describe preferred embodiments of the embrittlement-resistant propylene polymer composition and sterilizable article of the invention, and are presented for illustrative purposes only.

Unless otherwise specified, all quantities of ingredients are in pph of the propylene polymer material except, of course, for the propylene polymer material.

The physical properties set forth in the Tables were measured by the following methods:

| | |
|---|---|
| Tensile strength at yield | ASTM D-638 (using a 2-in/min crosshead without extensometer) |
| Yield Elongation | ASTM D-638 |
| Flexural Modulus | ASTM D-790 and D-618, Procedure A (0.5 in/min. crosshead speed and center section of a molded T-bar) |
| Heat Distortion Temp. (HDT) | ASTM D-648, load 18.6 Kg/cm$^2$ |
| Melt Flow Rate (MFR) | ASTM D-1238, Condition L |
| Haze | ASTM D-1003-92, (2.5" × 2.5" × 0.040" specimens) |
| Drop weight impact (DWI) | Internal test method which measures the height at which a given weight in pounds is dropped on a plaque of product of given dimension, typically 5" × 5" × 0.090", breaks 50% of the time. A copy of this test method is available upon request from Montell North America Inc. |

Example 1

This Example illustrates the polyolefin composition of this invention and the preparation thereof.

85 grams of crystalline, random copolymer of 95.25% propylene and 4.75 weight % butene, were mixed together with 15 grams of an elastomeric copolymer having a molar ratio of polyethylene and polybutene of 70:30, Uvasil 299 polymethyl-propyl-3-oxy-[4-(2,2,6,6-tetramethyl) piperidinyl]siloxane, a hindered amine light stabilizer in an amount of 0.125 part per 100 parts by weight polymer, 0.18 part of Millad 3988 sorbitol compound per 100 parts by weight polymer, and 0.1 part of sodium stearate per 100 parts by weight of polymer. The crystalline copolymer and the elastomeric copolymer were prepared by sequential polymerization using a catalyst comprising a titanium chloride compound supported on an activated magnesium chloride material.

The ingredients, which were in finely divided or particulate condition, were tumble blended until a homogeneous mixture is obtained (approximately 3 minutes). The mixture was then extruded at 450° F. and 125 rpm in a Davis Standard, tapered, counter-rotating, single screw extruder. The resulting blend was extruded as a strand, cooled in water, and pelletized to form the sample formulation of Example 1. The sample formulation is summarized in Table 1 below.

A first sample of the pellets was used to determine the melt flow rate of the polymeric composition, while a second portion of the pellets was made into tensile and flex bars using a 200 ton HPM injection molding machine with a barrel temperature of 450° F. and a mold temperature of 140° F. The molding cycle consisted of a 16 second injection time, 20 second cooling time, and 2 second mold open time, with a maximum injection speed (15 setting) and a screw setting of 2. The tensile and flex bars so produced were used to determine the tensile strength, flexural modulus, and heat distortion temperature (HDT) of the polymeric composition.

A third portion of the pellets were injection molded into 2.5"×2.5"×0.040" plaques which were used to evaluate haze properties after exposure to cobalt 60 gamma radiation at a dose level of 3 MRad using conventional techniques and apparatus. A fourth portion of the pellets were used to injection mold the 5"×5"×0.090" plaques for DWI.

The data generated by these tests are set forth in Table 2 below.

Example 2

This Example illustrates another polyolefin composition of this invention and the preparation thereof.

Following the procedures of Example 1, a sample formulation was prepared from 93 grams of a crystalline, random copolymer of 97% propylene and 3 weight % ethylene; 7 grams of an elastomeric copolymer having a molar ratio of ethylene and propylene of 25:75, 0.125 part of Uvasil 299 per hundred parts by weight of polymer; 0.18 part by weight of Millad 3988 sorbitol compound per 100 parts by weight polymer; and 0.1 part by weight of sodium stearate per 100 parts by weight of polymer. Again, the crystalline copolymer and the elastomeric copolymer were prepared by sequential polymerization using a catalyst comprising a titanium chloride compound supported on an activated magnesium chloride material. The formulation is summarized in Table 1 below, while Table 2 summarizes the data generated for melt flow rate, tensile strength, flexural modulus, heat distortion temperature (HDT), flexibility as measured by the drop weight impact test (DWI), and haze for pellets produced from this formulation in accordance with the procedures of Example 1.

Example 3

This Example illustrates another polyolefin composition of this invention and the preparation thereof.

Following the procedures of Example 1, a sample formulation was prepared from 92.8 grams of a crystalline, random copolymer of 97% propylene and 3 weight % ethylene; 7.2 grams of an elastomeric copolymer having a molar ratio of ethylene and propylene of 32:68, 0.125 part by weight of Uvasil 299 per hundred parts by weight of polymer; 0.18 part by weight of Millad 3888 sorbitol compound per 100 parts by weight of polymer; and 0.1 part by weight of sodium stearate per 100 parts by weight polymer. Again, the crystalline copolymer and the elastomeric copolymer were prepared by sequential polymerization using a catalyst comprising a titanium chloride compound supported on an activated magnesium chloride material. The delta MFR between the crystalline polymer and the elastomeric polymer was 0.67. The formulation is summarized in Table 1 below, while Table 2 summarizes the data generated for melt flow rate, tensile strength, flexural modulus, heat distortion temperature (HDT), flexibility as measured by the drop weight impact test (DWI), and haze for pellets produced from this formulation in accordance with the procedures of Example 1.

Comparative Example 1

This Comparative Example illustrates a typical visbroken, mobilizer-containing formulation used commercially to manufacture sterilizable articles.

100 grams of a homopolymer of polypropylene having a melt flow rate of 0.4 was visbroken with Lupersol 101 peroxide to a melt flow rate of 12 were mixed with 4.7 weight percent of Drakeol 34 hydrocarbon oil mobilizing additive, Tinuvin 770 hindered amine light stabilizer, in an amount of 0.125 part per 100 parts by weight polymer, 0.18 part of Millad 3940 sorbitol compound per 100 parts by weight polymer, and 0.1 part of sodium stearate per 100 parts by weight of polymer. The propylene homopolymer was prepared using a catalyst comprising a titanium chloride compound supported on an activated magnesium chloride material. The sample formulation is summarized in Table 1 below, while Table 2 summarizes the data generated for melt flow rate, tensile strength, flexural modulus, heat distortion temperature (HDT), flexibility as measured by the drop weight impact test (DWI), and haze for pellets produced from the comparative sample formulation in accordance with the procedures of Example 1.

TABLE 1

| | Sample Formulation | | | | | |
|---|---|---|---|---|---|---|
| Example No. | Crystalline Polymer, wt. % | Elastomeric Polymer, wt. % | HALS, pph | Sorbitol compound, pph | Sodium Stearate, pph | Oil Mobilizer |
| 1 | 85% of random copolymer | 15% of ethylene/ butene | 0.125 pph Uvasil 299[1] | 0.18 pph Millad 3988[2] | 0.1 | - 0 - |
| 2 | 93% of random copolymer | 7% of ethylene/ propylene | 0.125 pph Uvasil 299 | 0.18 pph Millad 3988 | 0.1 | - 0 - |
| 3 | 92.8% of random copolymer | 7.2% ethylene/ propylene | 0.125 pph Uvasil 299 | 0.18 pph Millad 3988 | 0.1 | - 0 - |
| Comparative Example 1 | 100% poly- propylene | — | 0.125 pph Tinuvin 770[4] | 0.18 pph Millad 3940[3] | 0.1 | 4.7% |

[1]Uvasil 299 polymethyl-propyl-3-oxy-[4-(2,2,6,6-tetramethyl)piperidinyl] siloxane.
[2]Bis(3,5-dimethylbenzylidene)sorbitol, commercially available from the Milliken Corporation.
[3]Bis(paramethylbenzylidene)sorbitol, commercially available from the Milliken Corporation.
[4]Bis(2,2,6,6-tetramethyl-4-piperidyl)sebacate.

TABLE 2

| Example No. | Melt Flow Rate | Irradiation (MRad) | Haze (0.040" thick) | Flex Modulus | Tensile Strength | HDT | DWI |
|---|---|---|---|---|---|---|---|
| 1 | 12 | 3 | 16.4% | 160 kpsi | 3800 psi | 87.5° C. | >45 ft – lb |
| 2 | 27 | 3 | 11.5% | 134 kpsi | 3807 psi | 78.6° C. | >45 ft – lb |
| 3 | 6.5 | 3 | 19.1% | 128 kpsi | 3677 psi | 74.7° C. | >45 ft – lb |
| Comp. Ex. 1 | 12 | 3 | 12% | 161 kpsi | 4642 psi | 89.0° C. | - 0 - |

Example 4

This Example illustrates the manufacture of syringes from the polyolefin composition of this invention.

Yet another portion of the pellets prepared in Examples 1–3 and Comparative Example 1 were manufactured into syringes using conventional injection molding techniques and apparatus. Syringes prepared from the sample formulations were exposed to cobalt 60 gamma radiation at a nominal dose level of 3 MRad using conventional techniques and apparatus.

Figure 1:
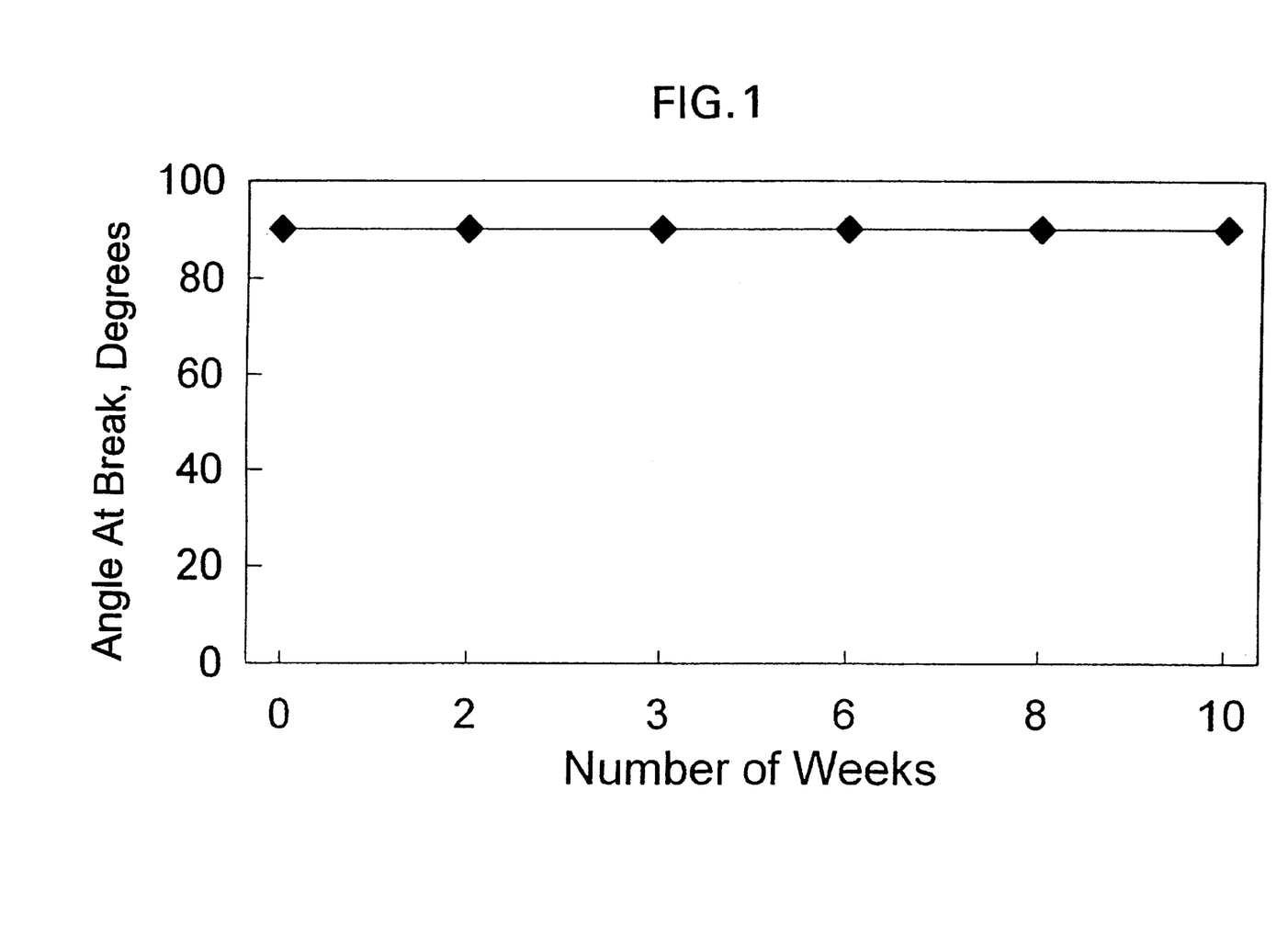
FIG. 1 depicts a graph of break angle of syringe samples manufactured from the non-visbroken, non-oil-modified polyolefin composition of Example 1, and maintained at 60° C. over a period of 10 weeks.
Figure 2:
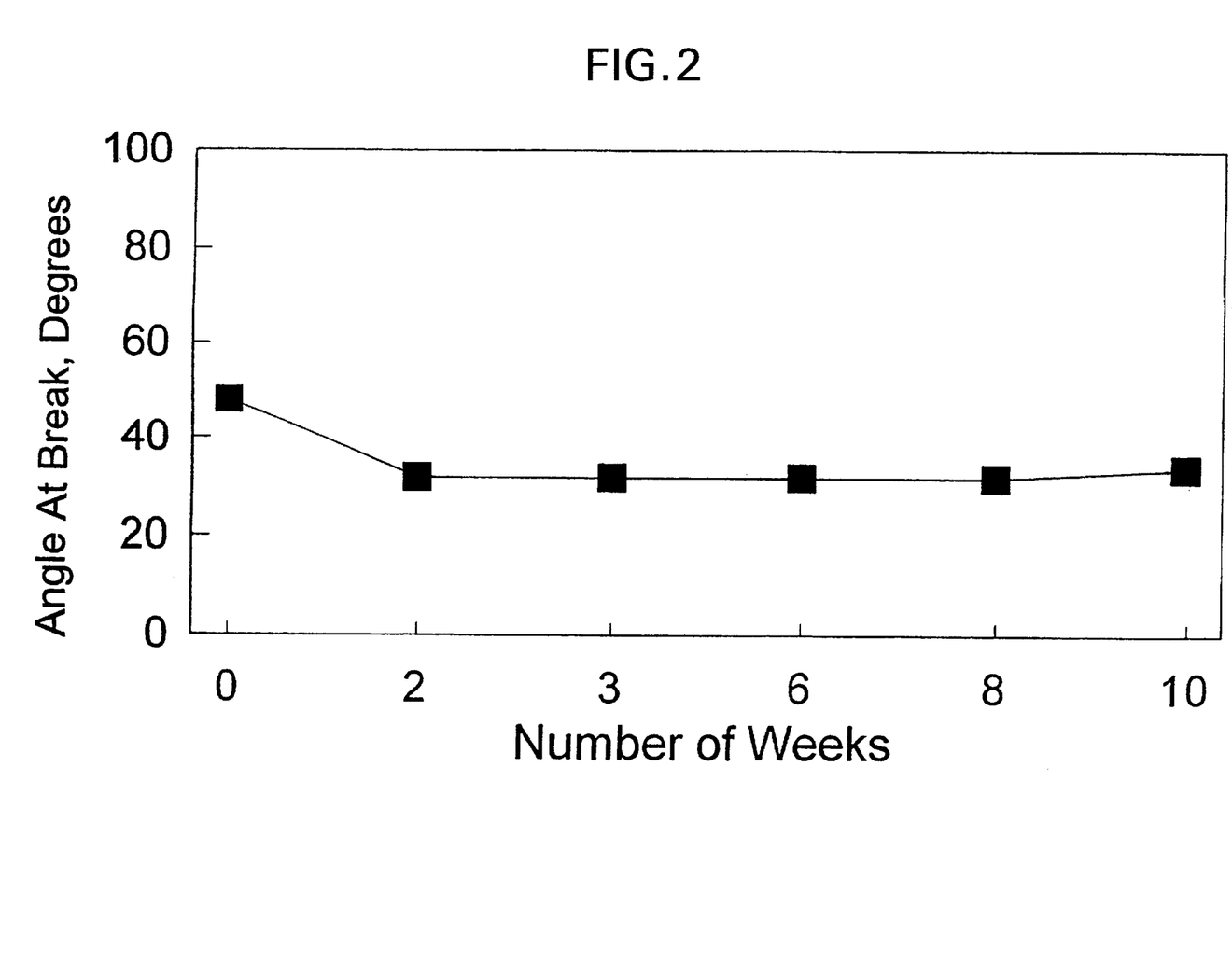
FIG. 2 depicts a graph of break angle of syringe samples manufactured from the visbroken, oil-modified polyolefin composition of Comparative Example 1, and maintained at 60° C. over a period of 10 weeks.
Figure 3:
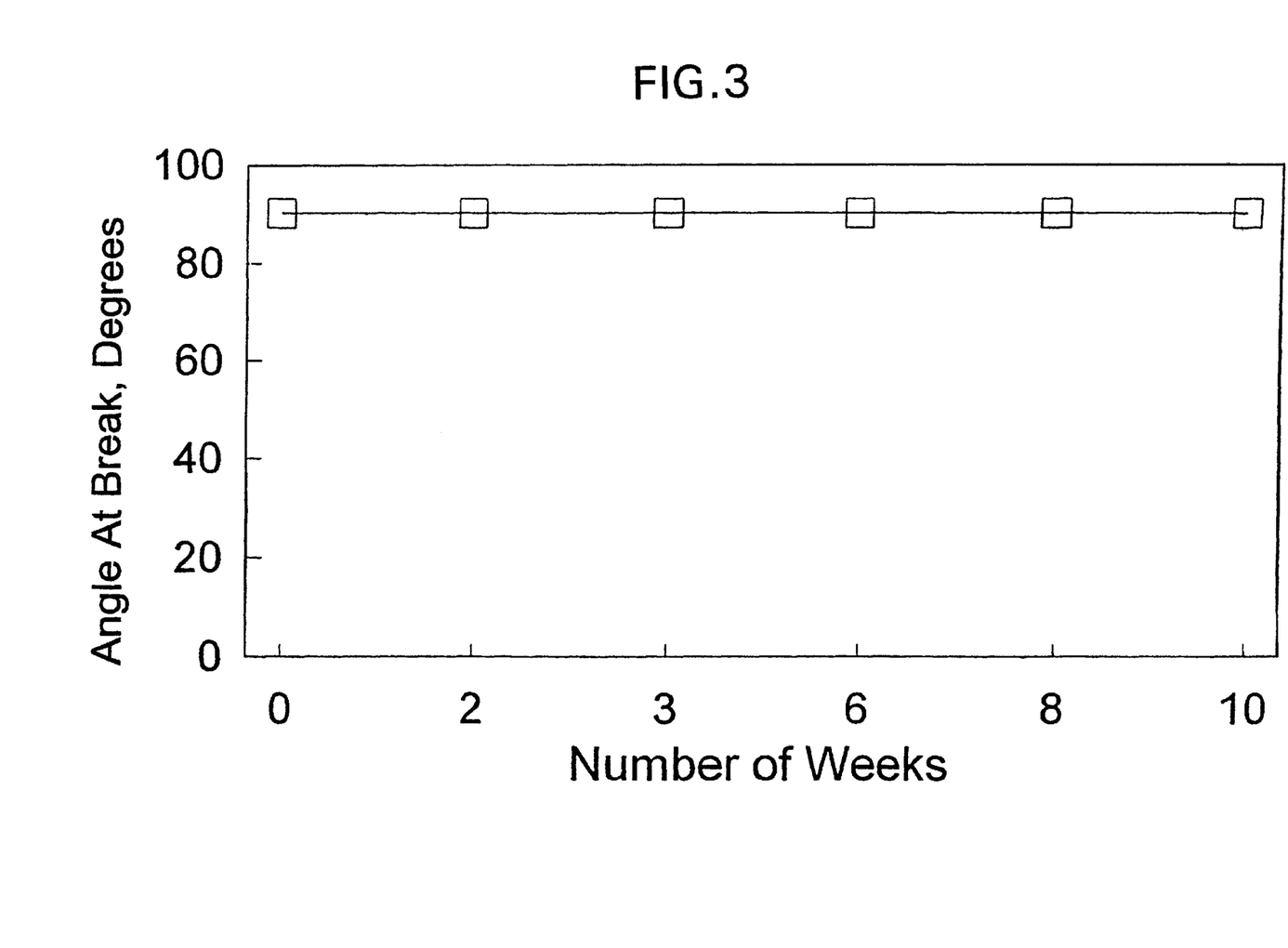
FIG. 3 depicts a graph of break angle of syringe samples manufactured from the non-visbroken, non-oil-modified polyolefin composition of Example 3, and maintained at 60° C. over a period of 10 weeks.
Figure 4:
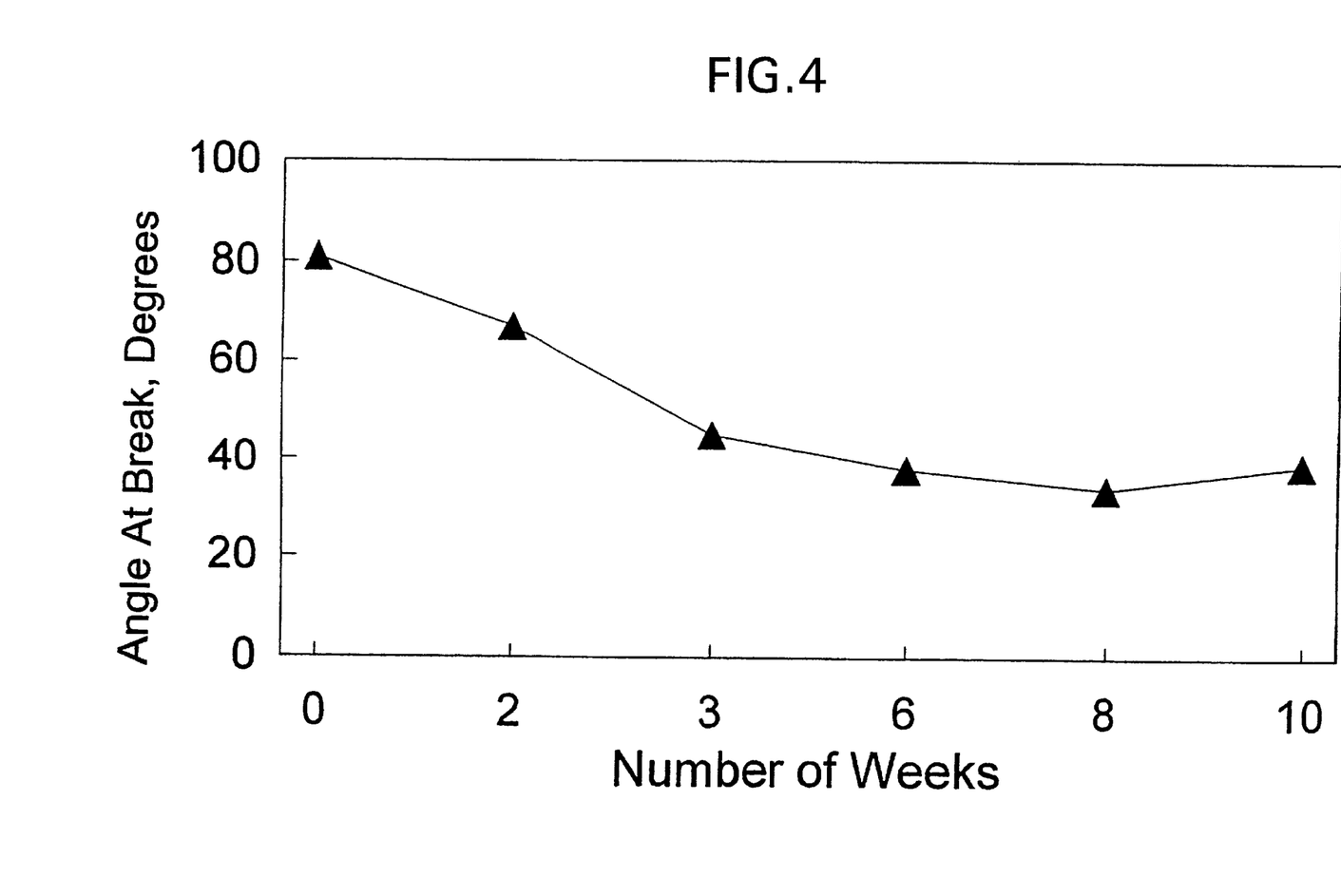
FIG. 4 depicts a graph of break angle of syringe samples manufactured from the non-visbroken, non-oil-modified polyolefin composition of Example 2, and maintained at 60° C. over a period of 10 weeks.

The syringes were then tested for flexibility by determining the "final bend angle" according to the following procedure:

Using an Instron tester, the syringe barrel flange is bent through an arc until it breaks. The angle at which breakage occurs is a measure of flexibility. 90° is the maximum break angle—and thus the maximum amount of flexibility—which can be determined by this test. Eight syringes are sacrificed per test, and the angles of breakage averaged. Tests were conducted at 0, 2, 4, 6 and 8 weeks of storage at 60° C. "Initial bend angle" is the average angle of breakage determined shortly after syringe production and without any elevated temperature storage. The "final bend angle" is the average angle of breakage determined after 8 weeks of storage. See FIGS. 1 through 4, which show the bend angle of the irradiated syringes molded from the three inventive compositions remain more flexible than irradiated syringes prepared from the visbroken polymer composition over time. Table 3 below summarizes the viscosity, initial and final bend angles of the syringe samples prepared from the non-visbroken inventive compositions and the visbroken, mobilizing additive-containing control composition:

TABLE 3

| Example No. | Final MFR | Visbroken | Oil Modifier | Sorbitol Compound | Initial Bend Angle | Final Bend Angle |
|---|---|---|---|---|---|---|
| Comp. Ex. 1 | 12 | Yes | Yes | Yes | 50 | 35 |
| 1 | 12 | No | No | Yes | 90 | 90 |
| 3 | 6.5 | No | No | Yes | 90 | 90 |
| 2 | 27 | No | No | Yes | 80 | 40 |

The data shows that the polyolefin composition of this invention does not require a costly visbreaking step or the incorporation of an additional additive such as a mobilizing oil to impart radiation resistance. A particularly important advantage is that the polyolefin composition of this invention resists embrittlement over time. A surprising feature is that the polyolefin composition of this invention contains an elastomeric component and yet is substantially transparent. Yet another advantage is that the polyolefin composition of this invention has a high heat distortion temperature, which makes it suitable for autoclaving operations. These characteristics permit the polyolefin composition to be manufactured into flexible, transparent articles which can be sterilized either by autoclaving or by radiation.

We claim:

1. An embrittlement-resistant polyolefin composition, comprising:
   (a) at least 80% by weight, based on the total weight of the polyolefin composition, of a crystalline polymer comprising either a propylene homopolymer having an isotactic index greater than 90 or a random copolymer of propylene and either ethylene or $C_4$–$C_{10}$ 1-olefins,
   (b) an elastomeric copolymer comprising ethylene and either propylene or butene-1,
   wherein the elastomeric copolymer is present in an amount sufficient to enhance the flexibility of the polyolefin composition, without adversely affecting the clarity of the polyolefin composition, such that the polyolefin composition exhibits a haze not greater than 19.1% when measured according to ASTM D-1003-92 using specimens having a thickness of 0.040 inch,
   wherein said polyolefin composition has a heat distortion temperature of at least 60° C., measured according to ASTM D-648, and wherein said composition has a Δ MFR of from 0 to 2.0 g/10 minutes, wherein Δ MFR is equal to a melt flow rate of said crystalline polymer minus a melt flow rate of said elastomeric copolymer, and wherein melt flow rate is measured according to ASTM D-1238, Condition L.

2. The polyolefin composition of claim 1, wherein said Δ MFR is from 0 to 0.7.

3. The polyolefin composition of claim 1, wherein said elastomeric copolymer has been polymerized in the presence of a metallocene catalyst.

4. The polyolefin composition of claim 3, wherein a chi value of said elastomeric copolymer is at least 0.90, wherein chi value is a measure of the randomness of the distribution of the monomers in said elastomeric copolymer based on $^{13}C$ NMR spectral data.

5. The polyolefin composition of claim 1, wherein said elastomeric copolymer has an ethylene content of 30 to 80% mole percent.

6. The polyolefin composition of claim 5, wherein said elastomeric copolymer has an ethylene content of 65 to 75% mole percent.

7. The polyolefin composition of claim 1, wherein said crystalline polymer is present in an amount of at least 85% by weight of the polyolefin composition.

8. The polyolefin composition of claim 1, wherein said polyolefin composition exhibits a haze of from 11 to 17%.

9. The polyolefin composition of claim 1, wherein said crystalline polymer is a random copolymer having a propylene content of at least 95% by weight.

10. The polyolefin composition of claim 1, further comprising at least one hindered amine light stabilizer selected from the group consisting of polymethyl propyl 3-oxy-[4-(2,2,6,6-tetramethyl)piperidinyl]siloxane; bis(2,2,6,6-tetramethyl-4-piperidyl) sebacate; bis-(1,2,2,6,6-pentamethyl-4-piperidyl) sebacate; bis-(1,2,2,6,6-pentamethyl-4-piperidyl)-2-n-butyl-2-(3,5-di-tert-butyl-4-hydroxybenzyl)malonate; 4-benzoyloxy-2,2,6,6,-tetramethyl piperidine; 1,2,3,4-tetra(2,2,6,6-tetramethyl-4-piperidyl) butanetetra-carboxylate;1,4-di-(2,2,6,6-tetramethyl-4-piperidyl)-2,3-butanedione; tris-(2,2,6,6-tetramethyl-4-piperidyl) trimellitate; 1,2,2,6,6-pentamethyl-4-piperidyl stearate; 1,2,2,6,6-pentamethyl-4-piperidyl n-octoate; tris-(2,2,6,6-tetramethyl-4-piperidyl) nitrile sebacate; 4-hydroxy-2,2,6,6-tetramethylpiperidine; 4-hydroxy-1,2,2,6,6-pentamethylpiperidine; and 1,1'-(1,2-ethanediyl)bis 3,3,6,6-tetramethylpiperadinone.

11. The polyolefin composition of claim 10, wherein said hindered amine light stabilizer is polymethyl-propyl-3-oxy-[4-(2,2,6,6-tetramethyl)piperidinyl]siloxane.

12. The polyolefin composition of claim 1, further comprising at least one acid neutralizing agent selected from the group consisting of metal soaps, hydrotalcites, aluminum silicate, sodium stearate and oxides and hydroxides of Group IIA metals.

13. The polyolefin composition of claim 1, further comprising at least one sorbitol-based compound selected from the group consisting of bis-(3,5-dimethylbenzylidene) sorbitol; (1,3)2,4-di(p-methylbenzylidene) sorbitol; (1,3)2,4-di(p-chlorobenzylidene) sorbitol; and (1,3)2,4-di(p-methoxybenzylidene) sorbitol.

14. The polyolefin composition of claim 1, wherein said composition does not contain a mobilizing additive.

15. A sterilizable article in which at least part of the material construction thereof comprises the polyolefin composition of claim 1.

16. The sterilizable article of claim 15, wherein said article is selected from the group consisting of syringe barrels, syringe plungers, tubing, forceps, surgical clamps, tissue culture tubes, and fibers for surgical gowns.

17. The sterilizable article of claim 15, having a heat distortion temperature of at least 70° C., measured according to ASTM D-648.

18. A sterilized article in which at least part of the material construction thereof comprises the polyolefin composition of claim 1.

19. The embrittlement-resistant polyolefin composition of claim 1, wherein said crystalline polymer is present in an amount of 85% to 93% by weight, and said elastomeric copolymer is present in an amount of 7 to 15% by weight.

* * * * *

UNITED STATES PATENT AND TRADEMARK OFFICE
CERTIFICATE OF CORRECTION

PATENT NO. : 5,929,147
DATED : July 27, 1999
INVENTOR(S) : David E. Pierick et al It is certified that error appears in the above-indentified patent and that said Letters Patent is hereby corrected as shown below:

At col. 12, line 2, change "IIA" to --II--.

Signed and Sealed this

Twenty-fifth Day of April, 2000

Attest:

Q. TODD DICKINSON

Attesting Officer

Director of Patents and Trademarks